United States Patent
Matsuki et al.

(10) Patent No.: US 9,389,722 B2
(45) Date of Patent: Jul. 12, 2016

(54) USER INTERFACE DEVICE THAT ZOOMS IMAGE IN RESPONSE TO OPERATION THAT PRESSES SCREEN, IMAGE ZOOM METHOD, AND PROGRAM

(75) Inventors: Tomoaki Matsuki, Tokyo (JP);
Hiroyuki Tsuchida, Kanagawa (JP);
Yoshisato Ono, Kanagawa (JP)

(73) Assignee: KDDI CORPORATION, Tokyo (JP)

( * ) Notice: Subject to any disclaimer, the term of this patent is extended or adjusted under 35 U.S.C. 154(b) by 80 days.

(21) Appl. No.: 14/342,815

(22) PCT Filed: Sep. 5, 2012

(86) PCT No.: PCT/JP2012/072568
§ 371 (c)(1),
(2), (4) Date: May 23, 2014

(87) PCT Pub. No.: WO2013/035725
PCT Pub. Date: Mar. 14, 2013

(65) Prior Publication Data
US 2014/0300569 A1    Oct. 9, 2014

(30) Foreign Application Priority Data
Sep. 9, 2011    (JP) .................................. 2011-197202

(51) Int. Cl.
*G06F 3/041*    (2006.01)
*G09G 3/20*    (2006.01)
(Continued)

(52) U.S. Cl.
CPC .............. *G06F 3/0414* (2013.01); *G06F 3/016* (2013.01); *G06F 3/041* (2013.01); *G06F 3/0488* (2013.01);
(Continued)

(58) Field of Classification Search
CPC ....... G06F 3/041; G06F 3/0412; G06F 3/0416; G06F 3/04883; G06F 3/0488; G06F 3/044; G06F 3/0418
See application file for complete search history.

(56) References Cited

U.S. PATENT DOCUMENTS

2004/0108992 A1*   6/2004  Rosenberg ................... 345/156
2006/0284858 A1*  12/2006  Rekimoto ..................... 345/173
(Continued)

FOREIGN PATENT DOCUMENTS

JP    A-11-288340    10/1999
JP    A-2009-151505    7/2009
(Continued)

OTHER PUBLICATIONS

International Search Report issued in International Patent Application No. PCT/JP2012/072568 dated Oct. 16, 2012.
(Continued)

*Primary Examiner* — Olga Merkoulova
(74) *Attorney, Agent, or Firm* — Oliff PLC (57) ABSTRACT

A method is disclosed of controlling a user interface device for displaying on a display screen a plurality of objects, and for enabling a user to perform an input action by touching the display screen with the user's finger. This method includes: upon the user's touch to the display screen at a region of one of the plurality of objects being displayed, selecting the one object as a zoom target; upon an event occurring in which an intensity of the finger's touch on the display screen exceeds a predetermined threshold, determining a magnification ratio of the zoom target or a change rate of the magnification ratio, based on the intensity of the finger's touch; and zooming in the zoom target on the display screen with the determined magnification ratio or the determined change rate.

16 Claims, 6 Drawing Sheets

(51) Int. Cl.
*G06F 3/0488* (2013.01)
*G06F 3/01* (2006.01)

(52) U.S. Cl.
CPC ............ *G09G 3/20* (2013.01); *G06F 2203/014* (2013.01); *G06F 2203/04105* (2013.01); *G06F 2203/04106* (2013.01); *G06F 2203/04806* (2013.01); *G09G 2340/045* (2013.01)

(56) References Cited

U.S. PATENT DOCUMENTS

| 2007/0226646 | A1* | 9/2007 | Nagiyama et al. | 715/784 |
| 2009/0160793 | A1* | 6/2009 | Rekimoto | 345/173 |
| 2010/0123686 | A1* | 5/2010 | Klinghult et al. | 345/178 |
| 2010/0315438 | A1* | 12/2010 | Horodezky | G06F 3/0481 345/661 |
| 2014/0359438 | A1* | 12/2014 | Matsuki | 715/702 |

FOREIGN PATENT DOCUMENTS

| JP | A-2010-517197 | 5/2010 |
| JP | A-2011-13861 | 1/2011 |
| WO | WO 2008/094791 A2 | 8/2008 |

OTHER PUBLICATIONS

International Preliminary Report on Patentability issued in International Patent Application No. PCT/JP2012/072568 dated Mar. 12, 2014.

Office Action issued in Japanese Patent Application No. 2011-197202 dated Feb. 28, 2014 (with translation).

* cited by examiner

USER INTERFACE DEVICE THAT ZOOMS IMAGE IN RESPONSE TO OPERATION THAT PRESSES SCREEN, IMAGE ZOOM METHOD, AND PROGRAM

TECHNICAL FIELD

The invention relates to techniques directed to user interface devices for displaying an image on a display screen and for allowing a user to perform an input operation or motion by touching the user's finger to the display screen in association with the displayed image.

This application claims under the Paris Convention the benefit of the priority of Japanese Patent Application No. 2011-197202 filed on 9 Sep. 2011, which is hereby incorporated by reference herein in its entirety for the purposes of PCT Rule 20.6.

BACKGROUND ART

User interface devices have been widespread, which enable a user's input motion or operation by manipulating a display screen with the user's finger, stylus, etc. Notably, an increasing number of mobile information devices typified by such as smart phones, tablet computers, electronic books or PDAs (Personal Digital Assistants) have incorporated touch panels serving as a user interface device that receives the user's finger motion as an input signal.

Irrespective of whether a touch panel is incorporated or not, a mobile information device needs to be downsized for a greater mobility. Due to this, in case a mobile information device is equipped with a user interface device in the form of a plurality of physical input keys or buttons, these keys themselves need to be reduced in size, resulting in a risk that the operability of the mobile information device becomes poorer. In contrast, incase a mobile information device is equipped with a user interface device in the form of a touch panel using a plurality of virtual buttons instead of physical buttons, these virtual buttons can be well adjusted in size depending on the functions of applications assigned to these buttons, with a greater capability of improving the operability or maneuverability of the mobile information device.

As for an information device allowing a user to perform an input action by touching a touch panel with the user's finger, it is a key factor for greater maneuverability of the information device to ease a user's action required for enlarging, zooming in or magnifying an image displayed on a display screen of a display of the information device. In particular, for a mobile information device, a display screen of a display is limited in size, and an image such as a text like a newspaper or a magazine, or a picture like a photograph or a map cannot be enlarged to the user's satisfaction. As a result, in many cases, a user is troubled in perceiving information expressed with a string of letters or a pictorial portion of a displayed image. For these reasons, providing the function of enlarging such an image is critical to a user, and therefore, easing the user's action required for image enlargement is also critical to a user.

A so-called pinch-out or outward pinch gesture is known as a user's action or gesture required for image enlargement. The pinch-out gesture is a gesture in which user moves two fingers (e.g., the thumb and the index finger of the right hand of the user) farther apart while touching a touch screen with those two fingers. In contrast, a gesture required for image reduction is a pinch-in or inward pinch gesture in which the user moves two fingers closer together.

For example, Patent Document No. 1 discloses a technique of displaying a partial image of a displayed image in enlargement, by causing a user to perform a particular form of touch to a touch screen with two fingers altogether. In addition, this document also discloses a technique of further enlarging the enlarged partial image by causing the user to move those two fingers farther apart by sliding those two fingers on the touch screen.

In addition, Patent Document No. 2 discloses a technique of recognizing a user's gestures using a multi-point sensing device that performs multi-touch detection (concurrent detection of a plurality of positions of touches). More specifically, when a user performs a gesture event in the form of a given combination of entries, an input action is invoked in association with the gesture event. This document describes the combination of entries (code) in the form of a user's input action provided by the user's gesture of pinching open (or close) two adjacent fingers.

PRIOR-ART REFERENCES

Patent Documents

Patent Document No. 1: Japanese Patent Application Publication No. 2011-13861
Patent Document No. 2: Japanese Patent Application Publication No. 2010-517197

SUMMARY OF THE INVENTION

Problem(s) that the Invention Attempts to Solve

Indeed, such conventional techniques as mentioned above allow a user to enlarge a displayed image on an information device through the user's operation of, manipulation of or interaction with a display screen with a finger of the user's one hand with which the user holds the mobile information device, but conventionally, the user's operation of the display screen required was troublesome.

In particular, for a user to enlarge a displayed image by the conventional form of the pinch-out or outward-pinch gesture as disclosed also in Patent Document Nos. 1 and 2, the user is required to use fingers of the user's another hand that is not used for holding the information device. Such a device necessarily requires the user to operate the device with the user's both hands.

In view of that, for enabling a user to enlarge a displayed image through single-handed manipulation, it can be proposed to design a device to allow a user to manipulate the device with one or more fingers of the user's one hand used for holding the device, without requiring the user to perform such a pinch gesture as mentioned above, but, in that case, there will possibly be a risk of the user's more frequent incorrect manipulation of the device, which will create a significant need for averting unintended operation of the device due to the incorrect manipulation.

More specifically, if, for example, a device is designed to enlarge an image in response to a user's mere finger-touch to a display screen (a touch panel), without taking any special countermeasures, then the user's unintended finger-touch may invoke the device to perform image enlargement, or the user's unintended finger-touch may invoke the device to perform unintended type of operation different from image enlargement, if the position at which the user unintentionally touches the display screen corresponds to the unintended different operation.

Essentially, in case a user holds a device with one hand, there are limits in the number of occurrences and the number of types of manipulation events which the user can perform on the device using one or more fingers of the same hand, even if the device uses a touch panel capable of multi-touch detection. For this reason, unless any special countermeasures are taken, it is never easy for a user to correctly manipulate the device for issuing a request for image enlargement and reduction (zooming), so that the manipulation can be clearly distinguished from other types of manipulation such as those for selecting an icon, invoking the operation pre-assigned to the selected icon, or moving an image (scrolling), while adequately averting the device's unintended operation.

Then, the object of the invention is to provide a user interface device, an image-zooming method and a program for allowing a user to correctly invoke the device to enlarge or magnify a displayed image on a display screen, without invoking the device to perform unintended operation, even in case the user holds the device with one hand and manipulates the device with one or more fingers of the same hand.

Means or Steps for Solving the Problem(s)

The following modes are provided by the invention. These modes will be stated below such that these modes are divided into sections and are numbered, such that these modes depend upon other mode(s), where appropriate, and such that each mode in such a dependent form permits each technical feature set forth in each mode to be independent or separate according to the nature of the corresponding technical feature, where appropriate.

(1) A user interface device for displaying on a display screen a zoom target, and for enabling a user to perform an input action by touching the display screen with the user's finger, the user interface device comprising:

a touch-position recognizing unit configured to determine whether the finger's touch position on the display screen has an overlap with a region of the zoom target being displayed on the display screen;

a pressing-force sensor detecting a pressing force with which the finger presses the display screen;

a pressing-force recognizing unit configured to determine whether or not the detected pressing force is equal to or larger than a predetermined threshold; and a zoom controller configured to be activated in response to an event occurring in which the finger's touch position is determined to have an overlap with the region of the zoom target being displayed, and in which the detected pressing force is determined to be equal to or larger than the predetermined threshold, to zoom in the zoom target on the display screen.

(2) The user interface device according to mode (1), further comprising a zoom-speed determining unit configured to be activated in response to an event occurring in which the finger's touch position is determined to have an overlap with the region of the zoom target being displayed, and in which the detected pressing force is determined to be equal to or larger than the predetermined threshold, to determine a target value of a zoom-in speed indicative of a change rate in a magnification ratio of the zoom target, as a function of a magnitude of the pressing force, wherein the zoom controller is configured to zoom in the zoom target such that an actual value of the magnification ratio of the zoom target creases at the determined target value of the zoom-in speed.

(3) The user interface device according to mode (1), further comprising a magnification-ratio determining unit configured to be activated in response to an event occurring in which the finger's touch position is determined to have an overlap with the region of the zoom target being displayed, and in which the detected pressing force is determined to be equal to or larger than the predetermined threshold, to determine a target value of a magnification ratio of the zoom target, as a function of a magnitude of the pressing force, wherein the zoom controller is configured to zoom in the zoom target such that an actual value of the magnification ratio of the zoom target is equal to the determined target value of the magnification ratio.

(4) The user interface device according to any one of modes (1) to (3), wherein the zoom controller is configured to zoom in the zoom target by using the finger's touch position as a zoom center point.

(5) The user interface device according to any one of modes (1) to (4), wherein the zoom controller is configured to zoom in the zoom target by using a position as a zoom-in center point, and to display on the display screen a to-be-selected-for-reduction object to be selected by the user for issuing a request for reducing the magnified zoom target, when the zoom target is magnified, the touch-position recognizing unit is configured to determine whether the finger's touch position has an overlap with a region of the to-be-selected-for-reduction object being displayed on the display screen, and the zoom controller configured to be activated in response to an event occurring in which the finger's touch position is determined to have an overlap with the region of the to-be-selected-for-reduction object being displayed, and in which the detected pressing force is determined to be equal to or larger than the predetermined threshold, to reduce the magnified zoom target by using a position substantially equal to the position used as the zoom-in center point, as a zoom-out center point.

(6) The user interface device according to mode (5), further comprising a zoom-speed determining unit configured to be activated in response to an event occurring in which the finger's touch position is determined to have an overlap with the region of the zoom target being displayed, and in which the detected pressing force is determined to be equal to or larger than the predetermined threshold, to determine a target value of a zoom-in speed indicative of an increase rate in a magnification ratio of the zoom target, as a function of a magnitude of the pressing force, wherein the zoom-speed determining unit is configured to be activated in response to an event occurring in which the finger's touch position is determined to have an overlap with the region of the to-be-selected-for-reduction object being displayed, and in which the detected pressing force is determined to be equal to or larger than the predetermined threshold, to determine a target value of a zoom-out speed indicative of a decrease rate in a magnification ratio of the zoom target, as a function of a magnitude of the pressing force, and the zoom controller is configured to magnify the zoom target such that an actual value of the magnification ratio of the zoom target creases at the determined target value of the zoom-in speed, or reduce the zoom target such that an actual value of the magnification ratio of the zoom target decreases at the determined target value of the zoom-out speed.

(7) The user interface device according to mode (5), further comprising a magnification-ratio determining unit configured to be activated in response to an event occurring in which the finger's touch position is determined to have an overlap with the region of the zoom target being displayed, and in which the detected pressing force is determined to be equal to or larger than the predetermined threshold, to determine a target value of a first magnification-ratio of the zoom target, as a function of a magnitude of the pressing force, wherein the magnification-ratio determining unit is configured to be activated in response to an event occurring in which the finger's touch position is determined to have an overlap with the region of the to-be-selected-for-reduction object being displayed, and in which the detected pressing force is determined to be equal to or larger than the predetermined threshold, to determine a target value of a second magnification-ratio of the zoom target, as a function of a magnitude of the pressing force, and the zoom controller is configured to magnify the zoom target such that an actual value of the magnification ratio of the zoom target is equal to the determined target value of the first magnification-ratio, or reduce the zoom target such that an actual value of the magnification ratio of the zoom target is equal to the determined target value of the second magnification-ratio.

(8) The user interface device according to any one of modes (1) to (4), wherein the zoom controller is configured to be activated after the zoom target is zoomed in, to restore the zoom target to a status equal to that of the zoom target found before the zoom target is zoomed in, upon disengagement of the finger from the display screen.

(9) The user interface device according to any one of modes (1) to (8), wherein the zoom controller is configured to be activated in response to the user's action of pressing the display screen at the zoom target with a finger of the user's one hand with which the user holds the user interface device, to zoom in the zoom target by using the finger's touch position as a zoom center point.

(10) A method of zooming an image on a user interface device for displaying on a display screen a zoom target, and for enabling a user to perform an input action by touching the display screen with the user's finger, the method comprising:

a first step of determining whether the finger's touch position on the display screen has an overlap with a region of the zoom target being displayed on the display screen;

a second step of determining whether or not a pressing force with which the finger presses the display screen is equal to or larger than a predetermined threshold; and a third step, implemented in response to an event occurring in which the finger's touch position is determined to have an overlap with the region of the zoom target being displayed, and in which the detected pressing force is determined to be equal to or larger than the predetermined threshold, of zooming in the zoom target on the display screen.

(11) A method of controlling a user interface device for displaying on a display screen a plurality of objects, and for enabling a user to perform an input action by touching the display screen with the user's finger, the method comprising:

upon the user's touch to the display screen at a region of one of the plurality of objects being displayed, selecting the one object as a zoom target;

upon an event occurring in which an intensity of the finger's touch on the display screen exceeds a predetermined threshold, determining a magnification ratio of the zoom target or a change rate of the magnification ratio, based on the intensity of the finger's touch; and zooming in the zoom target on the display screen with the determined magnification ratio or the determined change rate.

(12) A program to be executed by a computer to perform the method according to mode (10) or (11).

(13) A non-transitory computer-readable storage medium having stored therein the program according to mode (12).

Advantageous Effects of the Invention

A user interface device, an image-zooming method and a program according to the present invention allows a user to correctly invoke the user interface device to enlarge or magnify a displayed image on a display screen, while adequately preventing the user interface device from performing unintended operation, in case the user holds the device with one hand, even when the user manipulates the device with one or more fingers of the same hand.

MODES FOR CARRYING OUT THE INVENTION

Illustrative embodiments of the invention will be described below with reference to the drawings.

Each of user interface devices according to embodiments of the invention is configured to enlarge or magnify a zoom target on a display screen, in response to the user's finger press to a touch panel with a pressing force that is equal to or larger than a predetermined threshold. In illustrative embodiments of the invention, when the zoom target is enlarged, a to-be-selected-for-reduction object that can be manipulated by the user in order to reduce the zoom target, is displayed within the display screen of a display, and if, after the image is enlarged, the user presses the finger to the to-be-selected-for-reduction object, then the enlarged zoom target will be reduced or shrank.

It is noted that the term "zoom" is used in the context of images to refer to operation including both image enlargement and reduction. In addition, each of user interface devices according to embodiments of the invention is configured to allow a user to enter information (including instructions, commands or requests) through the user's finger touches to a touch panel. This allows such a user interface device to be incorporated into a mobile information device that can be held by a user with the hand(s) for manipulation, as typified by such as a smart phone or a tablet computer. Under these circumstances, a mobile information device will be described below as illustrative embodiments of the invention.

Figure 1A:
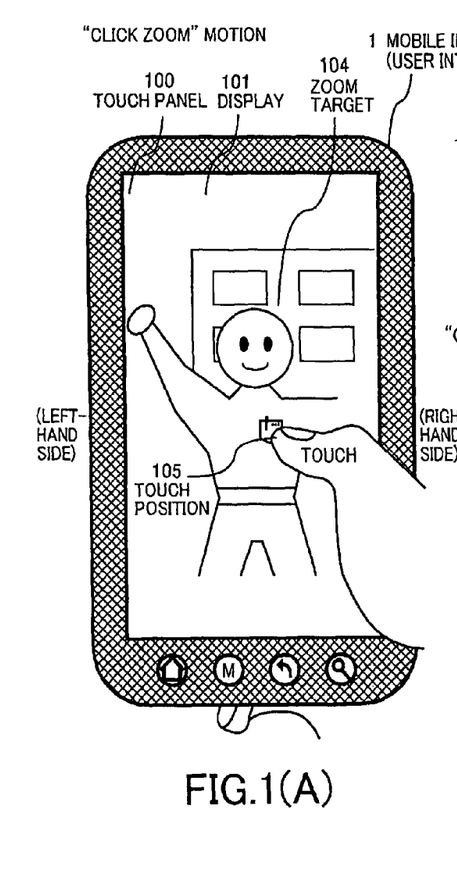
FIGS. 1(A) and 1(C) are front views illustrating a mobile information device according to an illustrative embodiment of the invention, wherein the mobile information device enlarges a zoom target in response to a user's "click zoom" motion.
Figure 1B:
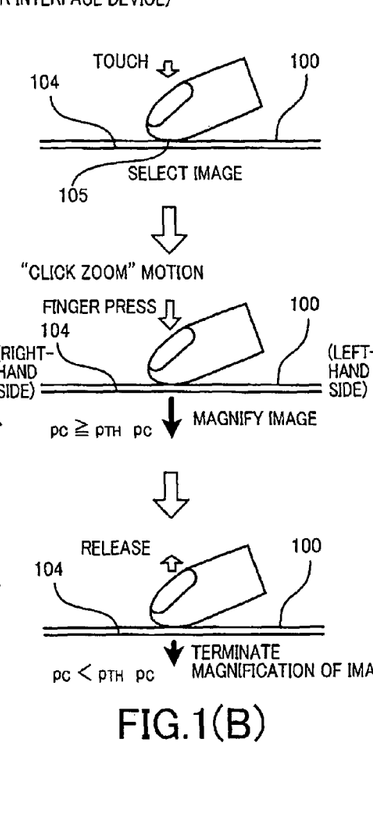
FIG. 1(B) is a schematic diagram illustrating the user's finger press to the mobile information device, which serves as the "click zoom" motion.
Figure 1C:
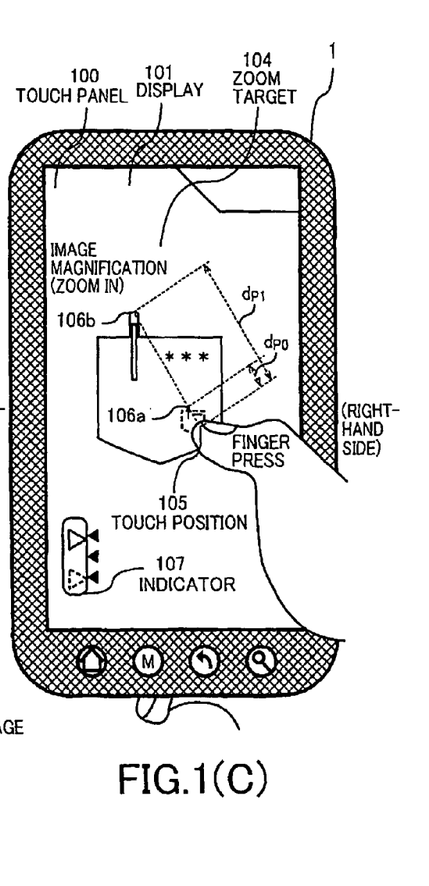

FIGS. 1(A) and 1(C) are front views illustrating a mobile information device 1 according to an embodiment of the invention, wherein the mobile information device 1 enlarges a zoom target in response to a user's "click zoom" motion for invoking the device 1 to enlarge the zoom target. FIG. 1(B) is a schematic diagram illustrating the user's finger press to a display screen of the mobile information device 1, which serves as the "click zoom" motion. It is noted that, in embodiments described below, the zoom target is a photograph, but an item to which the invention is applied is, of course, not limited to the photograph, but it may be replaced with, for example, a text in such as a newspaper or a magazine, or a picture in such as a book or a map.

As illustrated in FIG. 1(A), the mobile information device 1 includes a display 101 for displaying a zoom target 104 in the form of a portrait or a photograph of a person to be zoomed in or enlarged, and a touch panel 100 disposed on a display screen of the display 101. It is noted that, in the present embodiment, the zoom target 104 occupies the entire area of the display screen of the display 101, but alternatively it may occupy a predetermined sub-area that covers a portion of an image.

In order to enlarge the displayed zoom target 104, firstly, the user touches the finger to a sub-area of the zoom target 104 (the touch panel 100), wherein the user desires to display the sub-area in enlargement for getting a close-up view. In the present embodiment, the sub-area that the user desires to get a close-up view of is an image of a chest pocket of the person represented by the photograph, and so a finger touch position 105 is located within the image of the chest pocket. Next, as illustrated in FIG. 1(B), the user presses the finger to the zoom target 104 (the touch panel 100) at the finger touch position 105. As illustrated in FIG. 1(C), in response to the finger press, the zoom target 104 is displayed in enlargement.

Once a desired level of image enlargement has been accomplished, the user stops continuing the finger press, which is followed by the user's release of the finger from the finger touch position 105 (the touch panel 100), or by the user's hold of the finger still in contact with the finger tough position 105. With this, the enlargement process is terminated. It is noted that the mobile information device 1 may be alternatively designed to terminate image enlargement at the stage where a magnification or enlargement ratio α or a zoom factor of the zoom target 104 reaches a predetermined upper limit $α_{MAX}$.

The above-described finger press will be hereinafter referred to as "click zoom" motion. A finger press is qualified as the "click zoom" motion, if the following conditions are met:

a) The finger touch position 105 has an overlap with a region of the zoom target 104 being displayed; and b) At the time of the finger press, the finger presses the touch panel 100 with a pressing force $p_C$ whose magnitude satisfies the condition expressed with the following formula, with a predetermined pressing-force threshold being denoted as $p_{TH}$, $$p_C \geq p_{TH}. \qquad (1)$$

It is noted that the pressing-force threshold $p_{TH}$ can be set to a value within a range, for example, from 0.5 N to 2.0 N.

When the mobile information device 1 is designed to incorporate the above-mentioned condition b), the user's unintentional touches to the touch panel 100 with the user's finger, etc., do not improperly invoke the mobile information device 1 to enlarge the zoom target 104. The present embodiment, therefore, ensures that the zoom target 104 be enlarged only when the user intends to enlarge it and every time the user intends to enlarge it.

Further, as will be described below in reference to FIG. 4, the present embodiment makes it easy to design the mobile information device 1 so that, for example, the mobile information device 1 can clearly distinguish the user's motion for invoking the device 1 to entirely move the zoom target 104 (i.e., scroll), and the user's motion for invoking the device 1 to enlarge the zoom target 104, from each other.

In response to the "click zoom" motion, the zoom target 104 is enlarged using the finger touch position 105 as a zoom center point (i.e., a zoom-in center point). As a result, the entire image of the chest pocket, which a target image sub-area that the user desires to be enlarged, is displayed enlargement, which makes it easy for the user to view the target image sub-area so that information on the details can be obtained. At this point, as illustrated in FIG. 1(C), the finger touch position 105, a position 106a of the head of a pen in the chest pocket, the image of which is included in the non-enlarged image of the chest pocket, and a position 106b of the head of the pen in the enlarged image of the chest pocket are collinear in the description order. Referring to the distance between the finger touch position 105 and the position 106a as $d_{P0}$, and the distance between the finger touch position 105 and the position 106b as $d_{P1}$, the magnification ratio α of the zoom target 104 is expressed with the following equation:

$$α = d_{P1}/d_{P0} \qquad (2)$$

In this regard, the user can adjust a zoom-in speed $v_{ZI}$ indicative of a change rate of an image magnification or enlargement ratio (a rate at which the image magnification ratio α increases over time), by increasing or decreasing the intensity of the finger press, that is, the magnitude of the pressing force $p_C$. The zoom-in speed $v_{ZI}$ is defined by the following equation:

$$v_{ZI} = dα/dt \text{(time-derivative of α)}. \qquad (3)$$

In this regard, as will be elaborated below with reference to FIG. 2, the zoom target 104 is enlarged with the magnification ratio α increasing at the speed $v_{ZI}$ that increases as the pressing force $p_C$ becomes larger.

In a variant, the magnification ratio or zoom factor α is preferably determined as a function of the magnitude of the pressing force $p_C$ (in a phase in which the magnification ratio α increases). In an example, a function indicative of the relation between the pressing force $p_C$ as a function input and the magnification ratio α as a function output, may be formulated to indicate that the magnification ratio α increases monotonously with the pressing force $p_C$, and in that case, the function may be formulated as a linear function having a coefficient or factor (factor of proportionality) by which the pressing force $p_C$ (parameter) is multiplied and which is assigned a positive constant. In that case, the zoom target 104 is enlarged with the magnification ratio α that increases as the user presses the finger to the display screen harder (as the pressing force $p_C$ becomes larger).

Further, it is also preferable that a haptic feedback arrangement 102 (see FIG. 5) as described below imparts haptic feedback to the user's finger with an intensity level that changes with the zoom-in speed $v_{ZI}$. In an example, as the user presses the finger to the display screen harder, a higher level of the zoom-in speed $v_{ZI}$ is provided, and higher levels of vibrations are imparted to the finger. In that case, at the stage where a desired enlarged image is obtained ($v_{ZI}$=0), the process of vibrating the finger is terminated. This allows the user to feel an increase or a decrease in the zoom-in speed $v_{ZI}$ at the finger because of the vibrations, which realizes the user's real feel of maneuver of the device 1. In addition, it is also preferable to display within the display screen an indicator 107 representing instantaneous values of the magnification ratio α of the zoom target 104. The indicator 107 may be displayed during a period in which the magnification ratio α changes over time and/or during a predetermined length of time when the magnification ratio α ceases changing and becomes still.

As discussed above, the present embodiment allows the user to enlarge the zoom target 104 through the "click zoom" motion in which the user presses the finger to the display screen with the pressing force $p_C$ equal to or larger than the predetermined threshold $p_{TH}$. The finger used for performing this motion is, for example, a finger of the user's one hand with which the user holds the mobile information device 1 (the thumb of the right hand in an example of FIGS. 1(A) and 1(C)). Thus, as opposed to the conventional pinch-out gesture, the "click zoom" motion does not require the user to use two or more fingers. Further, in the present embodiment, pure finger-touch to the zoom target 104 ($p_C$<$p_{TH}$) does not trigger image enlargement. As a result, the user can enlarge the zoom target 104 as intended, while adequately averting incorrect operation, even though the mobile information device 1 is manipulated by the finger of the user's one hand holding the mobile information device 1.

Figure 2:
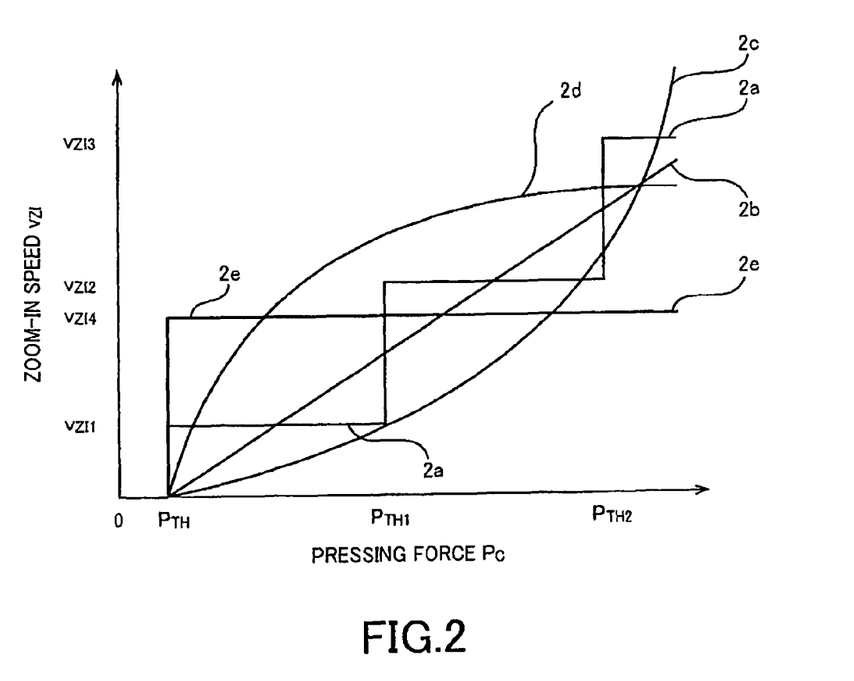
FIG. 2 is a graph showing variations of the correspondence between a pressing force $p_C$ and a zoom-in speed $v_{ZI}$ indicative of a change rate of an image magnification ratio or a zoom factor, wherein the variations are acceptable to the mobile information device depicted in FIG. 1.

FIG. 2 is a graph showing variations of the correspondence between the pressing force $p_C$ and the zoom-in speed $v_{ZI}$ which are acceptable to the mobile information device 1.

In FIG. 2, five different relationships 2a, 2b, 2c, 2d and 2e between the pressing force $p_C$ and the zoom-in speed $v_{ZI}$ are graphed. According to the relationship 2a, the zoom-in speed $v_{ZI}$ is set to $v_{ZI1}$ within a range of the finger's pressing forces $p_C$ satisfying $p_{TH} \leq p_C < p_{TH1}$, to $v_{ZI2}$ (>$v_{ZI1}$) within a range of the pressing forces $p_C$ satisfying $p_{TH1} \leq p_C < p_{TH2}$, and to $v_{ZI3}$ (>$v_{ZI2}$) within a range of the pressing forces $p_C$ satisfying $p_{TH2} \leq p_C$. In this case, the zoom-in speed $v_{ZI}$ increases in steps, as the user's finger pressing force to the display screen becomes larger.

In addition, according to the relationship 2b, the zoom-in speed $v_{ZI}$ is directly proportional to the pressing force $p_C$, and so is set to a value continuously increasing as the pressing force $p_C$ increases. In this case, the zoom-in speed $v_{ZI}$ increases proportionally, as the user's finger pressing force to the display screen becomes larger.

Additionally, according to the relationship 2c, the zoom-in speed $v_{ZI}$, within a lower range of the pressing forces $p_C$, increases at a smaller slope (representing an acceleration) as the pressing force $p_C$ becomes larger, while the zoom-in speed $v_{ZI}$, within a higher range of the pressing force $p_C$, increases at a greater slope as the pressing force $p_C$ becomes larger, which slope increases as the pressing force $p_C$ becomes larger. In this case, assuming that the pressing force $p_C$ increases generally linearly over time, the zoom target 104 is enlarged with an enlargement ratio that gently increases at an initial stage where the finger press has started, and then rapidly increases as the finger press becomes stronger.

In addition, according to the relationship 2d, the zoom-in speed $v_{ZI}$, within a lower range of the pressing forces $p_C$, increases at a greater slope (representing an acceleration) as the pressing force $p_C$ becomes larger, while the zoom-in speed $v_{ZI}$, within a higher range of the pressing forces $p_C$, increases at a smaller slope as the pressing force $p_C$ becomes larger, which slope decreases as the pressing force $p_C$ becomes larger and eventually becomes still. In this case, assuming that the pressing force $p_C$ increases generally linearly over time, the zoom target 104 is enlarged with an enlargement ratio that rapidly increases at an initial stage where the finger press has started, gently increases at around the stage where the finger has been pressed up to a point, and finally increases at a generally constant rate (the change rate of the magnification ratio α is kept constant and the acceleration is zero).

Additionally, according to the relationship 2e, the zoom-in speed $v_{ZI}$ is set to a constant value ($v_{ZI4}$), irrespective of how large the pressing force $p_C$ is, as long as the finger's pressing force $p_C$ is equal to or larger than the pressing-force threshold $p_{TH}$ ($p_C \geq p_{TH}$). In this case, once the user has pressed the finger to the display screen with a force equal to or larger than $p_{TH}$, the zoom target 104 is enlarged with a constant zoom-in speed ($v_{ZI4}$), as long as the force does not thereafter decrease to a value equal to or smaller than $p_{TH}$, irrespective of whether the force thereafter increases or decreases.

It is noted that the relationships as described above may be replaced with alternative relationships exhibiting different profiles or characteristics. However, in any one of those alternative relationships, it is preferable that the zoom-in speed $v_{ZI}$ is defined as a function of the pressing force $p_C$ which indicates that the zoom-in speed $v_{ZI}$ monotonously increases as the pressing force $p_C$ increases, or a function of the pressing force $p_C$ which indicates that the zoom-in speed $v_{ZI}$ does not decrease as the pressing force $p_C$ increases. In other words, it is preferable to determine the zoom-in speed $v_{ZI}$ as a function of the pressing force $p_C$ such that the zoom-in speed $v_{ZI}$ is kept from being lowered even when the pressing force $p_C$ increases. This allows the user to keep feeling that the harder the display screen is pressed, the more rapidly the factor increases with which an image is enlarged, over an entire range of possible values of the pressing force $p_C$, irrespective of which characteristic the accepted relationship has.

Figures 3A, 3B:
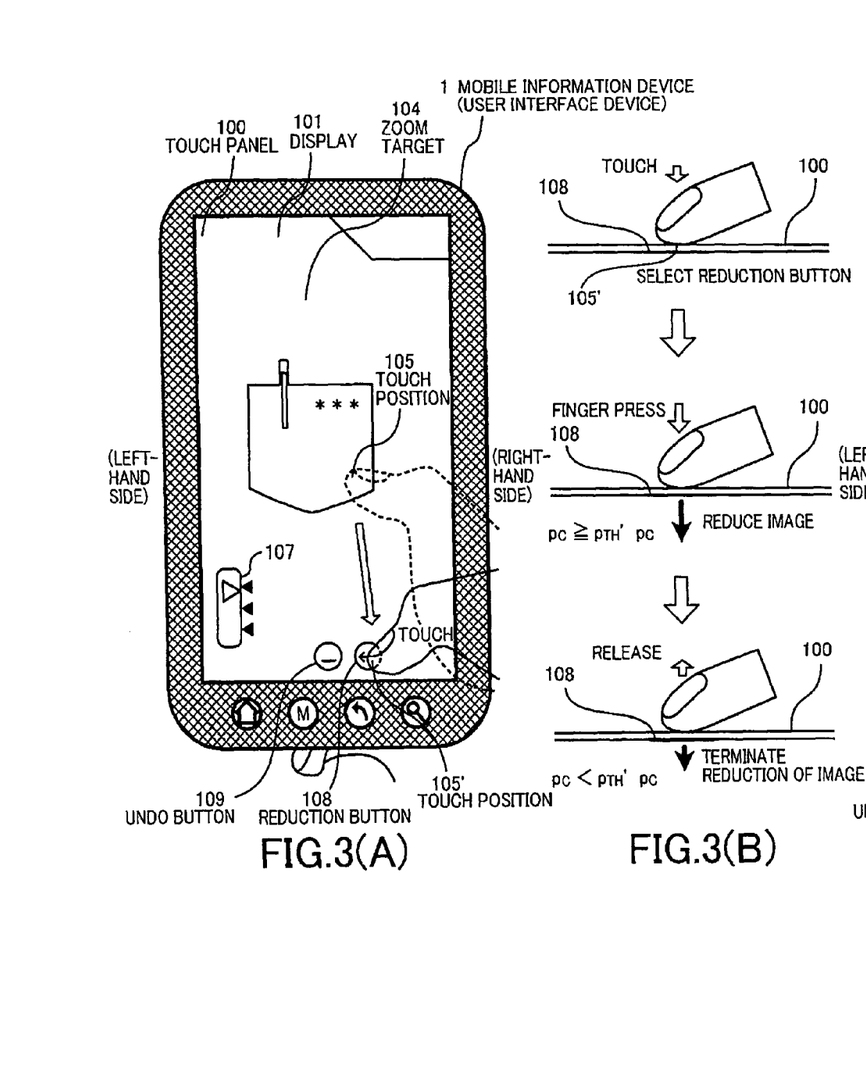
FIGS. 3(A) and 3(C) are front views illustrating the mobile information device depicted in FIG. 1, wherein the mobile information device reduces a zoom target in response to the user's motion for invoking reduction of the enlarged zoom target.
FIG. 3(B) is a schematic diagram illustrating the user's finger press to the mobile information device in order to issue a request for reducing the zoom target.
Figure 3C:
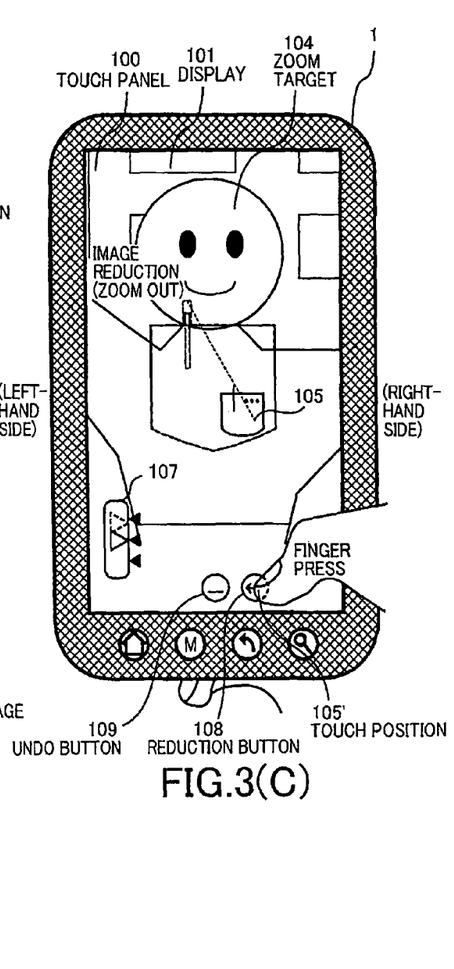

FIGS. 3(A) and 3(C) are front views illustrating the mobile information device 1, wherein the mobile information device 1 reduces the enlarged zoom target 104, in response to the user's motion for invoking reduction of the enlarged zoom target. FIG. 3(B) is a schematic diagram illustrating the user's finger press to the display screen of the mobile information device 1 in order to reduce the zoom target.

In an example depicted in FIG. 3(A), the zoom target 104 is being displayed in enlargement on the display screen of the display 101. Further, a reduction button 108, which is an example of the to-be-selected-for reduction object which is selected by the user to reduce the zoom target 104 is also being displayed on the display screen. In addition, it is preferable that an undo button 109 to be selected for restoring or reducing back the enlarged zoom target 104 to the non-enlarged zoom target 104 (of a magnification ratio α=1) is also displayed on the display screen.

Figure 6:
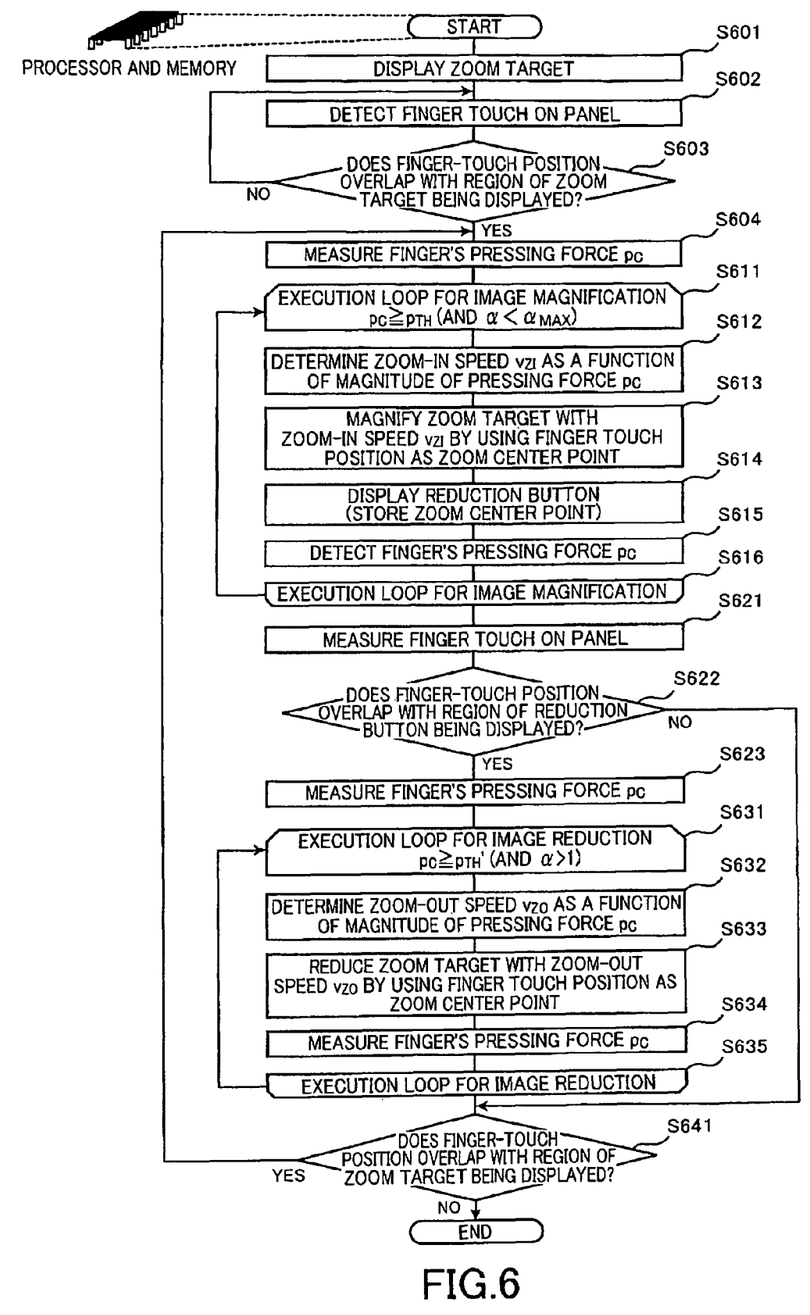
FIG. 6 is a flowchart conceptually illustrating an image-zooming method executed in the mobile information device depicted in FIG. 1, by its processor.

The reduction button 108 and the undo button 109 may be displayed on the display screen when the zoom target 104 is enlarged (see step S614 of FIG. 6). It is preferable that the reduction button 108 and the undo button 109 are displayed on the display screen in the form of translucent images to avert creation of visual obstructions to the zoom target 104 when being viewed.

In order to reduce the enlarged zoom target 104, the user moves the finger away from the finger touch position 105 (the touch panel 100) to which the finger had been touched for invoking the image enlargement, and then touches the finger to the reduction button 108. Thereafter, as illustrated in FIG. 3(B), the user presses the finger to the reduction button 108 (the touch panel 100). In response to the finger press, as illustrated in FIG. 3(C), the zoom target 104 is displayed as a reduced image.

Once the desired level of image reduction has been accomplished, the user stops performing the finger press, and releases the finger from the reduction button 108 (the touch panel 100), or holds the finger just in contact therewith. Then, the reduction process is terminated. It is noted that it is desirable that the reduction process is terminated at the stage where the magnification ratio α of the zoom target 104 has returned to "1."

The above-described finger press for image reduction invokes the reduction of the zoom target 104, if the following conditions are met:
c) The finger touch position 105' ("'" is suffixed thereto for identifying a first position that is away from the finger touch position 105) has an overlap with the region of the reduction button 108 being displayed, and
d) At the time of the finger press, the finger presses the touch panel 100 with a pressing force $p_C$ whose magnitude satisfies the condition expressed with the following formula, with a predetermined pressing-force threshold being denoted as $p_{TH}'$, $$Pc \geq p_{TH}'. \qquad (4)$$

It is noted that the pressing-force threshold $p_{TH}'$ can be set to the same value as that of the pressing-force threshold $p_{TH}$ expressed with the formula (1).

In response to this finger press for image reduction, the zoom target 104 is reduced by using the initial finger touch position 105 (that was used for previous enlargement) as a zoom center point (i.e., a zoom-out center point). As a result, the user can return to the zoom target 104 of a desired zoom factor which was displayed at a time between a time when an original or before-enlargement-process image (of a magnification ratio α=1) was displayed and a time when a final or after-enlargement-process image was displayed.

In addition, the user can adjust a zoom-out speed $v_{ZO}$ indicative of a change rate of an image reduction ratio (a rate at which the image magnification ratio α decreases over time), by increasing or decreasing the intensity of the finger press, that is, the magnitude of the pressing force $p_C$. The zoom-out speed $v_{ZO}$ is defined by the following equation:

$$v_{ZO} = -d\alpha/dt \text{(time-derivative of } \alpha\text{)}. \qquad (5)$$

In this regard, the zoom target 104 is reduced with the magnification ratio α decreasing at the speed $v_{ZO}$ that becomes higher as the pressing force $p_C$ becomes larger. It is noted that the relationship between the pressing force $p_C$ and the zoom-out speed $v_{ZO}$ may be formulated by replacing, in FIG. 2, the zoom-in speed with the zoom-out speed $v_{ZO}$, and replacing the threshold $p_{TH}$ with the threshold $p_{TH}'$.

In a variant, the magnification ratio or zoom factor α is preferably determined as a function of the magnitude of the pressing force $p_C$ (in a phase in which the magnification ratio α decreases). In an example, a function indicative of the relation between the pressing force $p_C$ as a function input and the magnification ratio α as a function output, may be formulated to indicate that the magnification ratio α decreases monotonously with the pressing force $p_C$, and in that case, the function may be formulated as a linear function having a coefficient or factor (factor of proportionality) by which the pressing force $p_C$ (parameter) is multiplied and which is assigned a negative constant. In that case, the zoom target 104 is reduced with the magnification ratio α that decreases (the magnification ratio α becoming closer to "1") as the user presses the finger to the display screen harder (as the pressing force $p_C$ becomes larger).

It is noted that the to-be-selected-for-reduction object, which is manipulated by the user to reduce an image is not limited to the reduction button 108 in the form of a virtual button, but may be, for example, an operational object disposed in a predetermined region within the displayed image, for example, a sub-area of the display screen which is located at a bottom-right corner thereof.

In addition, the user's finger press of the undo button 109 reduces back the enlarged zoom target 104 to the original or before-enlargement zoom target 104 (of a magnification ratio α=1) at a time. The finger press invokes the restoration of the zoom target 104 to an original status or scale, if the following conditions are met:
e) The finger touch position 105''' ("'''" is suffixed thereto for identifying a second position that is away from the finger touch position 105) has an overlap with the region of the undo button 109 being displayed, and
f) At the time of the finger press, the finger presses the touch panel 100 with a pressing force $p_C$ whose magnitude satisfies the condition expressed with the following formula, with a predetermined pressing-force threshold being denoted as $p_{TH}''$, $$Pc \geq p_{TH}''. \qquad (6)$$

It is noted that the pressing-force threshold $p_{TH}''$ can be set to the same value as that of the pressing-force threshold $p_{TH}$ expressed with the formula (1).

In another variant, it is desirable that, if the user moves the finger which had been touched to the display screen for image enlargement, away from the finger touch position 105 (the touch screen 100), then the enlarged zoom target 104 is reduced back to the original or before-enlargement zoom target 104 (of a magnification ratio α=1) at a time. In that case, reducing back to an image (of a magnification ratio α=1) can be invoked without requiring the use of the reduction button 108 or the undo button 109, that is, without requiring the movement of the finger touch position along the display screen.

Figures 4A, 4B, 4C:
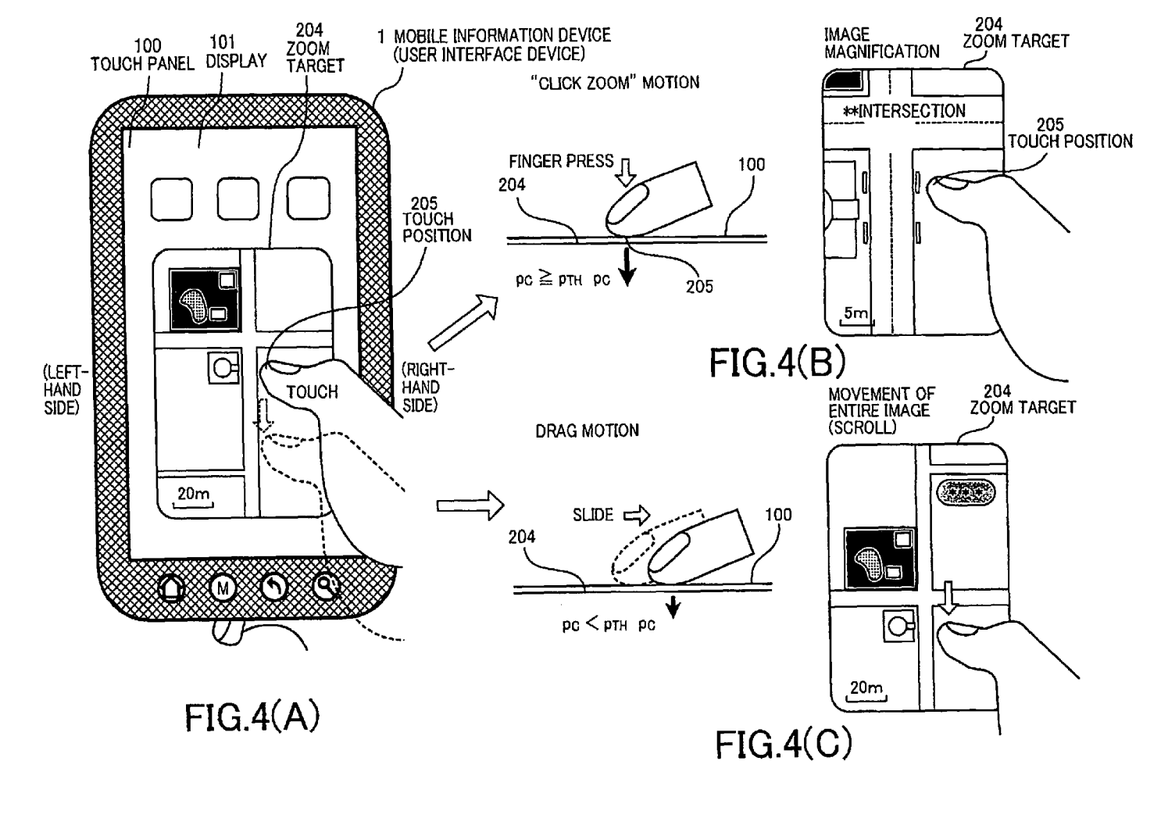
FIG. 4(A) is a front view illustrating the mobile information device depicted in FIG. 1, wherein the mobile information device is displaying an image of a map.
FIG. 4(B) illustrates how the mobile information device reduces the map image in response to the user's "click zoom" motion.
FIG. 4(C) illustrates how the mobile information device moves the map image in response to the user's drag motion, wherein FIGS. 4(B) and 4(C), as juxtaposed together, illustrate how the mobile information device recognizes the "click zoom" motion and the drag motion distinguishably from each other, and how the mobile information device implements the respectively corresponding sets of image processing.

FIG. 4(A) is a front view illustrating the mobile information device 1, and FIGS. 4(B) and 4(C) are schematic diagrams of a zoom target, for the illustration of how the mobile information device 1 recognizes the "click zoom" motion and a drag motion distinguishably from each other, and how the mobile information device 1 implements the respectively corresponding sets of image processing. It is noted that, in embodiments described below, the zoom target is a map, but an item to which the invention is applied is, of course, not limited to the map, but it may be replaced with, for example, a text in such as a newspaper or a magazine, or a picture in such as a book or a photograph.

In an example of FIG. 4(A), a map image 204, which is a zoom target and also an image to be moved (or scrolled), is displayed on the display screen of the display 101. As described before with reference to FIGS. 1(A) to 1(C), in order to enlarge the map image 204, the user performs the "click zoom" motion. As a result, as illustrated in FIG. 4(B), the map image 204 is enlarged by using a finger touch position 205 as a zoom center point. In this case, as described above, the finger pressing-force $p_C$ satisfies the condition expressed with the formula (1): $p_C \geq p_{TH}$.

In addition, in order to entirely move the map image 204 (scroll), the user firstly touches the finger to the map image 204 at one point (the touch position 205 in an example depicted in FIG. 4). Next, the user slides the finger in contact with the map image 204. That is, the user performs a so-called drag motion. As a result, as illustrated in FIG. 4(C), the map image 204 entirely is moved or scrolled in synchronization with the movement of the finger.

Designing the mobile information device 1 to recognize a drag motion when the pressing force $p_C$ satisfies not the condition of the formula (1) but $p_C < p_{TH}$ would allow the mobile information device 1 to recognize the drag motion clearly separately from the above-described "click zoom" motion. This design can be achieved by obtaining statistical values of the finger pressing-force $p_C$ that occur during events of the conventional drag motion, and giving a value that is significantly large as compared with the statistic values, to the threshold $p_{TH}$ which the pressing force $p_C$ must exceed for it to be qualified as the "click zoom" motion.

It is noted that, in the embodiment depicted in FIG. 4, the map image 204 is displayed within a region that is assigned to a sub-area of the display screen of the display 101 and that is fixed in size and position. The mobile information device 1 is designed such that the region of the map image 204 being displayed does not change its position or its size, even when the map image 204 is enlarged, and even when the map image 204 is moved (scrolled).

As described above, in the present embodiment, if the user presses the finger to the map image (a zoom target) 204 with a pressing force $p_C$ equal to or larger than a predetermined threshold $p_{TH}$, then the map image (a zoom target) 204 is enlarged. The present embodiment, therefore, allows the mobile information device 1 to recognize the "click zoom" motion and a pressing motion with a pressing force $p_C$ smaller than the predetermined threshold $p_{TH}$, such that they are distinguished from each other. As a result, when the user holds the mobile information device 1 with one hand, the user can perform a variety of motions including the "click zoom" motion, even with a finger of the one hand in a distinguishable manner, and the mobile information device 1 can recognize those motions distinguishably from each other.

Figure 5:
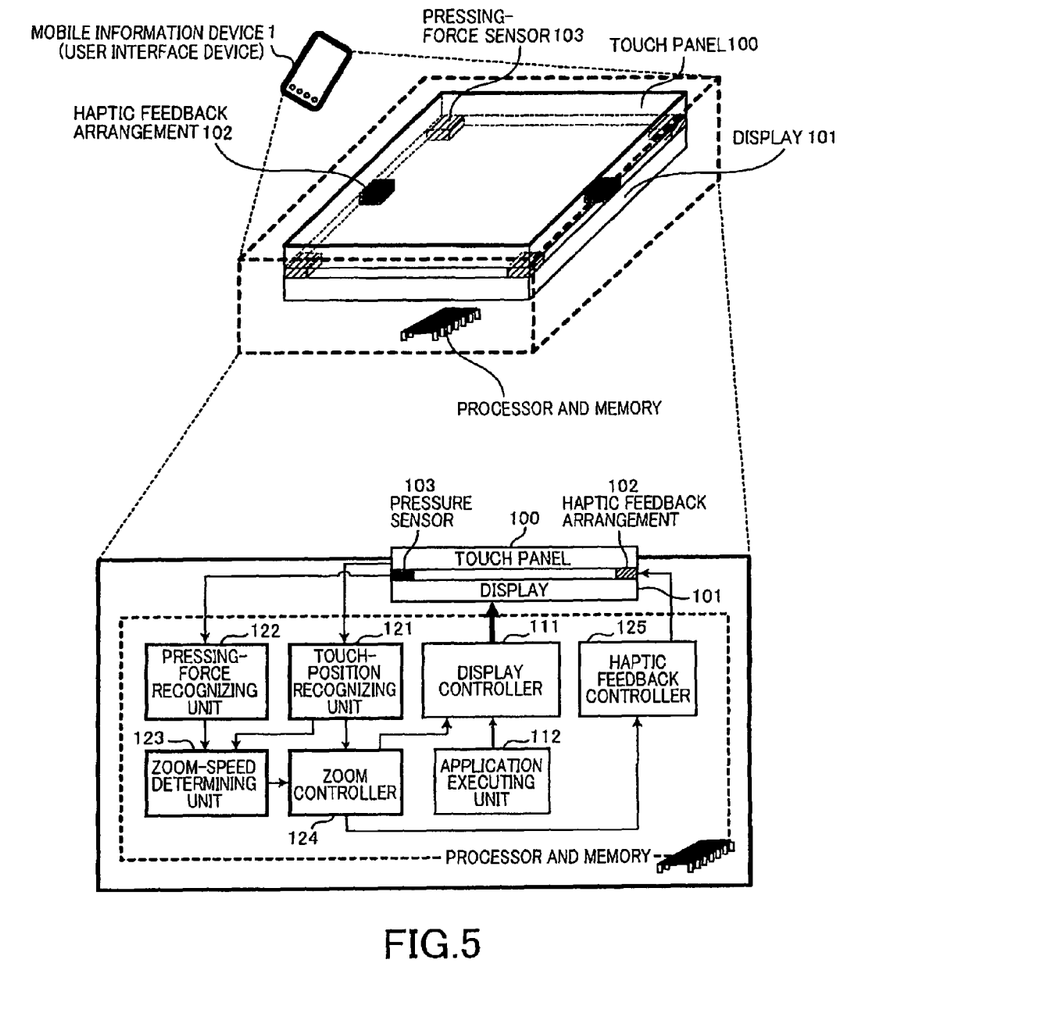
FIG. 5 illustrates the mobile information device depicted in FIG. 1 in a perspective view and a functional block diagram.

FIG. 5 schematically illustrates the mobile information device 1 in a perspective view and a functional block diagram.

As illustrated in FIG. 5, the mobile information device 1 includes the touch panel 100, the display 101, the haptic feedback arrangement 102, pressing-force sensors 103, and a processor and memory. The processor and memory executes an image-zooming control program to provide its function.

For the processor and memory, as well known, a processor and a memory together constitute a computer. The memory has previously stored therein the image-zooming control program for performing the image-zooming method as generally described above. The memory is an example of a computer-readable and non-transitory storage medium having stored therein the image-zooming control program.

The display 101 displays a zoom target ("104" in the examples depicted in FIGS. 1 and 3, and "204" in the example depicted in FIG. 4) on the display screen. In addition, the touch panel 100 is laid over the display screen of the display 101, and senses and outputs successive locations of the user's finger touch point on the display screen over time. The touch panel 100 may be in the form of a projected capacitive touch panel, a surface capacitive touch panel, a resistive touch panel, an ultra-sonic surface acoustic wave touch panel, an infra-red touch panel, or the like.

As described above, the touch panel 100 is laid over the display screen of the display 101, and so, to be exact, the user cannot touch the display screen of the display 101 with the finger, and what the user can touch is an exposed surface or a touch screen of the touch panel 100. Substantially, however, the user views the touch screen of the touch panel 100 and an image as if the image were displayed on the touch screen of the touch panel 100, and so, the touch screen of the touch panel 100 is equivalent to the display screen of the display 101. For the sake of explanation, therefore, throughout the specification, the surface of a control section of the mobile information device 1 is referred to as a display screen, irrespective of which component of the mobile information device 1 forms the surface.

Like in the present embodiment, when the display 101 and the touch panel 100 are constructed in a so-called dual layer type in which a display function and a touch panel function are provided by separate devices, the display screen of the display 101 and the touch screen of the touch panel 100 are separate from each other, and the touch screen is laid over the display screen, and alternatively, when the display 101 and the touch panel 100 are constructed in a so-called single layer type in which a display function and a touch panel function are provided by a single device, the display screen of the display 101 and the touch screen of the touch panel 100 are the same component.

The haptic feedback arrangement 102 vibrates the touch panel 100 to impart to the finger held in contact with the touch panel 100, haptic feedback as a response. In an example, as the zoom-in speed $v_{ZI}$ (zoom-out speed $v_{ZO}$) increases in response to an increasing intensity of the user's finger press, higher levels of the vibrations are imparted to the finger. The haptic feedback arrangement 102 may be, for example, in the form of a piezoelectric actuator formed with piezoelectric materials such as PZT (Lead Zirconate Titanate).

The pressing-force sensors 103 detect a pressing force $p_C$ with which the user presses the touch panel 100 with the finger. In an example, the pressing-force sensor 103 is disposed at each of four corners of the touch panel 100, and the pressing force $p_C$ is measured by totaling four component forces with which the pressing-force sensors 103 are pressed at the four corners, respectively, by deflection created in the touch panel 100 with the pressing finger (each component force is detected by each pressing-force sensor 103). In an example, the pressing-force sensor 103 may be in the form of a piezoelectric sensor formed with piezoelectric materials such as PZT. In another example, the pressing-force sensor 103 can be used to serve as a haptic feedback arrangement, instead of or in addition to the haptic feedback arrangement 102 formed with a piezoelectric actuator.

The pressing force $p_C$ with which the user presses a touch screen of the touch panel 100 is an example of a physical quantity expressing the intensity of a finger touch on the touch screen. The intensity of a finger touch can be expressed by at least one of the pressing force $p_C$, the size of an area in which the finger touches the touch screen, a change in electrical property in response to a finger touch on the touch screen, and a change in temperature in response to a finger touch on the touch screen. Therefore, in embodiments, the pressing force $p_C$ may be replaced with an alternative physical quantity that is categorized as the intensity of a finger touch, to provide the same function.

The above-mentioned processor and memory is configured to input from the touch panel 100 a finger-touch-position signal indicative of the position of a finger touch point, input from the pressing-force sensors 103 pressing-force signals indicative of pressing forces, and recognize each of the user's finger motions including the "click zoom" motion, based on the inputted signals. Next, the processor and memory performs image processing that corresponds to the recognized finger motion, for example, enlargement and reduction (zooming) of the zoom target 104 (204).

As illustrated in FIG. 5, the processor and memory incorporates a touch-position recognizing unit 121, a pressing-force recognizing unit 122, a zoom-speed determining unit 123, a zoom controller 124, a haptic feedback controller 125, a display controller 111, and an application executing unit 112.

The touch-position recognizing unit 121 inputs the finger-touch-position signal from the touch panel 100, and determines whether or not the finger touch position has an overlap with the region of the zoom target 104 (204) being displayed. The touch-position recognizing unit 121 outputs the determination to the zoom-speed determining unit 123 and the zoom controller 124. Further, the touch-position recognizing unit 121 determines whether or not the finger touch position has an overlap with the region of the reduction button 108 being displayed. The touch-position recognizing unit 121 outputs the determination to the zoom-speed determining unit 123 and the zoom controller 124. Still further, the touch-position recognizing unit 121 outputs information on the finger touch position to the zoom controller 124.

The pressing-force recognizing unit 122 inputs the pressing-force signals from the pressing-force sensors 103, and determines whether or not the finger pressing force $p_C$ is equal to or larger than the predetermined pressing-force threshold $p_{TH}$ ($p_{TH}'$). The pressing-force recognizing unit 122 outputs the determination and the detected pressing-force $p_C$ to the zoom-speed determining unit 123.

The zoom-speed determining unit 123, in response to an event occurring in which the zoom-speed determining unit 123 has received the determination that the finger touch position has an overlap with the region of the zoom target 104 (204) being displayed, and the determination that the pressing force $p_C$ is equal to or larger than the predetermined pressing-force threshold $p_{TH}$, determines the zoom-in speed $v_{ZI}$. The zoom-in speed $v_{ZI}$ is determined as a function of the magnitude of the pressing force $p_C$ received from the pressing-force recognizing unit 122. The zoom-speed determining unit 123 maintains a predetermined relationship between the pressing force $p_C$ and the zoom-in speed $v_{ZI}$, as illustrated in FIG. 2, at the memory, for example. The zoom-speed determining unit 123 successively calculates values of the zoom-in speed $v_{ZI}$ corresponding to values of the pressing force $p_C$ received from the pressing-force recognizing unit 122, and delivers the results to the zoom controller 124 in succession.

Further, the zoom-speed determining unit 123, in response to an event occurring in which the zoom-speed determining unit 123 has received the determination that the finger touch position has an overlap with the region of the reduction button 108 being displayed, and the determination that the pressing force $p_C$ is equal to or larger than the predetermined pressing-force threshold $p_{TH}'$, determines the zoom-out speed $v_{ZO}$. The zoom-out speed $v_{ZO}$ is determined as a function of the magnitude of the pressing force $p_C$ received from the pressing-force recognizing unit 122. The zoom-speed determining unit 123 maintains a predetermined relationship between the pressing force $p_C$ and the zoom-out speed $v_{ZO}$, such as a relationship obtained by replacing, in FIG. 2, the speed $v_{ZI}$ with the speed $v_{ZO}$, and the threshold $p_m$ with the threshold $p_{TH}'$, at the memory, for example. The zoom-speed determining unit 123 successively calculates values of the zoom-out speed $v_{ZO}$ corresponding to values of the pressing force $p_C$ received from the pressing-force recognizing unit 122, and delivers the results to the zoom controller 124 in succession.

The zoom controller 124, in response to an event occurring in which the zoom controller 124 has received the determination that the finger touch position has an overlap with the region of the zoom target 104 (204) being displayed, and the zoom controller 124 has received the zoom-in speed $v_{ZI}$ (determined when $p_C \geq p_{TH}$ is met), directs the display controller 111 to enlarge the zoom target 104 (204). At this point, the zoom center point for image enlargement is defined as the finger touch position 105, based on the information on the finger touch position received from the touch-position recognizing unit 121. In addition, the zoom controller 124 enlarges the zoom target 104 (204) with the received zoom-in speed $v_{ZI}$. At this point, the zoom center point for image enlargement (the finger touch position 105) is stored in the memory, for example, and it is stored until a new finger-touch-position is detected within the region of the zoom target 104 (204) being displayed.

In addition, the zoom controller 124, when enlarging the zoom target 104 (204), directs the display controller 111 to display within the display screen of the display 101, the reduction button 108, which is manipulated by the user to reduce the zoom target 104 (204).

Further, the zoom controller 124, in response to an event occurring in which the zoom controller 124 has received the determination that the finger touch position has an overlap with the region of the reduction button 108 being displayed, and the zoom controller 124 has received the zoom-out speed $v_{ZO}$ (determined when $p_C \geq p_{TH}'$ is met), directs the display controller 111 to reduce the zoom target 104 (204). At this point, the zoom center point for image reduction is defined as the finger touch position 105 that was stored in the memory, for example, at the time of the image enlargement. In addition, the zoom controller 124 reduces the zoom target 104 (204) with the received zoom-out speed $v_{ZO}$.

It is noted that, in an variant where, instead of the zoom-in or zoom-out speed, the magnification ratio α is determined as a function of the magnitude of the pressing force $p_C$, the zoom-speed determining unit 123 is replaced with a magnification-ratio determining unit. The zoom controller 124 inputs from the magnification-ratio determining unit the magnification ratio α determined by the magnification-ratio determining unit, as a target value of the magnification ratio α, and directs the display controller 111 to zoom the zoom target 104 (204) until an actual value of the magnification ratio α reaches the target value of the magnification ratio α.

In another variant, if the user moves the finger which had been touched to the display screen for image enlargement, away from the finger touch position 105 (the touch screen 100), then the enlarged zoom target 104 is reduced back to the original or before-enlargement zoom target 104 (of a magnification ratio α=1) at a time. In this case, the zoom controller 124 directs the display controller 111 to reduce the zoom target 104 (204) back to a display status in which the magnification ratio α=1, upon reception of information indicating that no finger touch position receives from the touch-position recognizing unit 121 (the finger has been move away from the touch panel 100) after the zoom target 104 is enlarged.

Still further, the zoom controller 124 delivers information indicative of the zoom-in speed $v_{ZI}$ and the zoom-out speed $v_{ZO}$ to the haptic feedback arrangement 102. Then, the haptic feedback controller 126 controls the haptic feedback arrangement 102 to impart the haptic feedback (e.g., vibrations) to the finger with the intensity varying as a function of the zoom-in speed $v_{ZI}$ or the zoom-out speed $v_{ZO}$, based on the information indicative of the zoom-in speed $v_{ZI}$, or the zoom-out speed $v_{ZO}$, wherein the information has been received from the zoom controller 124.

The display controller 111 inputs application execution information from the application executing unit 112, and commands the display 101 to display on the display screen an image associated with the application being executed. In addition, the display controller 111 inputs from the zoom controller 124 instruction information indicative of instructions for enlarging/reducing (zooming) the zoom target 104 (204), wherein the instruction information has been outputted from the zoom controller 124. Then, the display controller 111 commands the display 101 to display the zoom target 104 (204) such that the zoom target 104 (204) is zoomed with the zoom-in speed $v_{ZI}$ or the zoom-out speed $v_{ZO}$ which has been instructed.

FIG. 6 is a flowchart conceptually illustrating the image-zooming method executed in the mobile information device 1. With reference to this flowchart, this image-zooming method will be described below. This image-zooming method is implemented by causing the processor and memory to execute the image-zooming control program, and so the explanation about this image-zooming method serves also as the explanation about the image-zooming control program.

As illustrated in FIG. 6, firstly, the zoom target 104 (204) is displayed on the display 101 (step S601). Next, a finger touch is detected by the touch panel 100 (step S602). Thereafter, the touch-position recognizing unit 121 determines whether or not the finger touch position has an overlap with the region of the zoom target 104 (204) being displayed (step S603). If the touch-position recognizing unit 121 determines that the finger touch position has an overlap with the region of the zoom target 104 (204), then the pressing-force sensors 103 measure the finger pressing-force $p_C$ (step S604). If, however, the touch-position recognizing unit 121 determines that the finger touch position has no overlap with the region of the zoom target 104 (204), then the process proceeds back to step S602 for detection of the finger touch.

After the finger pressing-force $p_C$ is measured (step S604), the pressing-force recognizing unit 122 determines whether or not the pressing force $p_C$ is equal to or larger than the predetermined pressing-force threshold $p_{TH}$ (step S611). If it is determined that it is equal to or larger than the predetermined pressing-force threshold $p_{TH}$, then the zoom-speed determining unit 123 determines the zoom-in speed $v_{ZI}$ with which the zoom target 104 (204) is to be enlarged, as a function of the magnitude of the pressing force $p_C$ (step S612). Thereafter, the zoom controller 124 enlarges the zoom target 104 (204) with the determined zoom-in speed $v_{ZI}$, by using the detected finger touch position as a zoom center point (step S613).

Further, the zoom controller 124 displays the reduction button 108, which is to be manipulated by the user who desires to reduce the zoom target 104 (204), within the display screen of the display 101 (step S614). It is desirable that, at this point, the zoom center point for image enlargement (the finger touch position 105) is stored in the memory in preparation for upcoming possible activation of image reduction. Thereafter, the pressing-force sensors 103 again measure the finger pressing-force $p_C$ (step S615). Subsequently, the pressing-force recognizing unit 122 again determines whether or not the pressing force $p_C$ is equal to or larger than the predetermined pressing-force threshold $p_{TH}$ (step S616).

The execution of steps S611 through S616 as described above is repeated if the formula (1): $p_C \geq p_{TH}$ is met, to thereby constitute an execution loop for image enlargement.

In an variant, it is desirable that the conditions to be met for the repetition to be performed include a condition that the magnification ratio $\alpha$ of the zoom target 104 (204) is not higher than a predetermined upper limit $\alpha_{MAX}$, as well as the condition expressed with the formula (1). In that case, if the execution loop for image enlargement (image enlargement process) is started, then enlarging the zoom target 104 (204) is started, and the current execution loop for image enlargement (image enlargement process) is terminated at the stage where the magnification ratio $\alpha$ reaches the predetermined upper limit $\alpha_{MAX}$.

After the execution loop for image enlargement (steps S611 through S616) is terminated, the finger touch is again detected by the touch panel 100 (step S621). Thereafter, the touch-position recognizing unit 121 determines whether or not the finger touch position has an overlap with the region of the reduction button 108 being displayed (step S622). If the touch-position recognizing unit 121 determines that the finger touch position has an overlap with the region of the reduction button 108 being displayed, then the pressing-force sensors 103 again measure the finger pressing-force $p_C$ (step S623). If, however, the touch-position recognizing unit 121 determines that the finger touch position has no overlap with the region of the reduction button 108 being displayed, then the process proceeds to step S641 as described below.

After the finger pressing-force $p_C$ is measured (step S623), the pressing-force recognizing unit 122 determines whether or not the pressing force $p_C$ is equal to or larger than the predetermined pressing-force threshold $p_{TH}'$ (step S631). If it is determined that it is equal to or larger than the predetermined pressing-force threshold $p_{TH}'$, then the zoom-speed determining unit 123 determines the zoom-out speed $v_{ZO}$ with which the zoom target 104 (204) is to be reduced, as a function of the magnitude of the pressing force $p_C$ (step S632).

Thereafter, the zoom controller 124 reduces the zoom target 104 (204) with the determined zoom-out speed $v_{ZO}$, by using the finger touch position that has been stored in the memory, as a zoom center point (step S633). Subsequently, the pressing-force sensors again measure the finger pressing force $p_C$ (step S634). Thereafter, the pressing-force recognizing unit 122 again determines whether or not the pressing force $p_C$ is equal to or larger than the predetermined pressing-force threshold $p_{TH}'$ (step S635).

The execution of steps S631 through S635 as described above is repeated if the formula (4): $p_C \geq p_{TH}'$ is met, to thereby constitute an execution loop for image reduction. In another variant, it is desirable that the conditions to be met for the repetition to be performed include a condition that the magnification ratio $\alpha$ of the zoom target 104 (204) is higher than "1," as well as the condition expressed with the formula (4). In that case, if the execution loop for image reduction (image reduction process) is started, then reducing the zoom target 104 (204) is started, and the current execution loop for image reduction (image reduction process) is terminated at the stage where the magnification ratio $\alpha$ returns to "1."

After the execution loop for image reduction (steps S631 through S635) is terminated, the touch-position recognizing unit 121 again determines whether or not the finger touch position has an overlap with the region of the zoom target 104 (204) being displayed (step S641). If the touch-position recognizing unit 121 determines that the finger touch position has an overlap with the region of the zoom target 104 (204) being displayed, then the process proceeds back to step S604 for again measuring the finger pressing-force $p_C$. If, however, the touch-position recognizing unit 121 determines that the finger touch position has no overlap with the region of the zoom target 104 (204) being displayed, then this image-zooming method is terminated.

While some of embodiments of the present invention have been described above in detail with reference to the drawings, they are just examples, and the present invention may be embodied in alternative modes, which begin with the modes described in the section titled "Summary of the Invention," or which are obtained by making various modifications and improvements to the above-described embodiments, in view of the knowledge of those skilled in the art.

The invention claimed is:

1. A user interface device for displaying on a display screen a zoom target, and for enabling a user to perform an input action by touching the display screen with a finger, the user interface device comprising:
   a pressing-force sensor detecting a pressing force with which the finger presses the display screen;
   at least one of a virtual or physical reduction button and a virtual or physical undo button; and
   a zoom controller configured to:
      enlarge the zoom target in response to the detected pressing force exceeding a predetermined enlargement threshold, with an enlargement ratio of the zoom target depending on a magnitude of the pressing force, without requiring the user to operate an enlargement button,
      hold a size of the zoom target without restoring the size of the zoom target to an original size in response to a release of the finger from the display screen,
      wherein the reduction button is present, reduce the zoom target, in response to the user touching the reduction button, and
      wherein the undo button is present, restore the size of the zoom target so that the size becomes equal to the original size, in response to the user touching the undo button.

2. The user interface device according to claim 1, further comprising:
   a zoom-speed determining unit configured to:
      activate in response to the finger touching the display screen and the detected pressing force being equal to or larger than the predetermined threshold, and determine a target value of a zoom-in speed indicative of a change rate in a magnification ratio of the zoom target, as a function of a magnitude of the pressing force,
   wherein the zoom controller is configured to zoom in the zoom target such that an actual value of the magnification ratio of the zoom target increases at the determined target value of the zoom-in speed.

3. The user interface device according to claim 1, further comprising:
   a magnification-ratio determining unit configured to be activated in response to the finger touching the display screen and the detected pressing force being equal to or larger than the predetermined threshold, and to determine a target value of a magnification ratio of the zoom target, as a function of a magnitude of the pressing force,
   wherein the zoom controller is configured to zoom in the zoom target such that an actual value of the magnification ratio of the zoom target is equal to the determined target value of the magnification ratio.

4. The user interface device according to claim 1, wherein the zoom controller is configured to zoom in the zoom target by using a touch position of the finger as a zoom center point.

5. The user interface device according to claim 1, wherein the zoom controller is configured to zoom in the zoom target by using a position as a zoom-in center point, and to display on the display screen a to-be-selected-for-reduction object to be selected by the user for issuing a request for reducing the magnified zoom target, when the zoom target is magnified,
   the touch-position recognizing unit is configured to determine whether a touch position of the finger overlaps a region of the to-be-selected-for-reduction object being displayed on the display screen, and
   the zoom controller is configured to be activated when the touch position overlaps the region of the to-be-selected-for-reduction object being displayed and the detected pressing force is equal to or larger than the predetermined threshold, and to reduce the magnified zoom target by using a position substantially equal to the position used as the zoom-in center point, as a zoom-out center point.

6. The user interface device according to claim 5, further comprising:
   a zoom-speed determining unit configured to:
      activate when the finger's touch position overlaps a region of the zoom target being displayed and the detected pressing force is equal to or larger than the predetermined threshold, to determine a target value of a zoom-in speed indicative of an increase rate in a magnification ratio of the zoom target, as a function of a magnitude of the pressing force, and
      activate when the finger's touch position overlaps the region of the to-be-selected-for-reduction object being displayed and the detected pressing force is equal to or larger than the predetermined threshold, to determine a target value of a zoom-out speed indicative of a decrease rate in a magnification ratio of the zoom target, as a function of a magnitude of the pressing force,
   wherein the zoom controller is configured to magnify the zoom target such that an actual value of the magnification ratio of the zoom target increases at the determined target value of the zoom-in speed, or reduce the zoom target such that an actual value of the magnification ratio of the zoom target decreases at the determined target value of the zoom-out speed.

7. The user interface device according to claim 5, further comprising:
   a magnification-ratio determining unit configured to:
      activate when the finger's touch position overlaps a region of the zoom target being displayed and the detected pressing force is equal to or larger than the predetermined threshold, to determine a target value of a first magnification-ratio of the zoom target, as a function of a magnitude of the pressing force, and
      activate when the finger's touch position overlaps the region of the to-be-selected-for-reduction object being displayed and the detected pressing force is equal to or larger than the predetermined threshold, to determine a target value of a second magnification-ratio of the zoom target, as a function of a magnitude of the pressing force,
   wherein the zoom controller is configured to magnify the zoom target such that an actual value of the magnification ratio of the zoom target is equal to the determined target value of the first magnification-ratio, or reduce the zoom target such that an actual value of the magnification ratio of the zoom target is equal to the determined target value of the second magnification-ratio.

8. The user interface device according to claim 1, wherein the finger is of a hand of the user that holds the user interface device, and the zoom controller is configured to activate in response to an action of the user of pressing the display screen at the zoom target with the finger, to zoom in the zoom target by using the finger's touch position as a zoom center point.

9. The user interface device according to claim 1, wherein the zoom controller is further configured to:
vibrate the display screen to impart to the finger in touch with the display screen, haptic feedback as a response, with higher levels of vibrations as an intensity of the user touching the display screen with the finger becomes higher.

10. The user interface device according to claim 1, wherein the zoom controller is further configured to:
store in a memory a touch position of the finger on the display screen when the zoom target is being enlarged, as a zoom center point; and
reduce the zoom target using the same zoom center point as that previously stored in the a memory.

11. A method of zooming a zoom target displayed on a display screen of a user interface device including at least one of a virtual or physical reduction button and a virtual or physical undo button, and enabling a user to perform an input action by touching the display screen with a finger, the method comprising:
enlarging the zoom target on the display screen in response to the finger touching the display screen and a pressing force with which the finger presses the display screen being equal to or larger than a predetermined enlargement threshold, with an enlargement ratio of the zoom target depending on a magnitude of the pressing force, without requiring the user to operate an enlargement button;
holding a size of the zoom target without restoring the size of the zoom target to an original size in response to a release of the finger from the display;
when the reduction button is present, reducing the zoom target, in response to the user touching the reduction button; and
when the undo button is present, restoring the size of the zoom target so that the size becomes equal to the original size, in response to the user touching the undo button.

12. A method of zooming a zoom target displayed on a display screen of a user interface device including at least one of a virtual or physical reduction button and virtual or physical undo button, and enabling a user to perform an input action by touching the display screen with a finger, the method comprising:
enlarging the zoom target on the display screen in response to an increase in an intensity of a touch of the finger on the display screen, with an enlargement ratio of the zoom target depending on the touch intensity, without requiring the user to operate an enlargement button;
holding a size of the zoom target without restoring the size of the zoom target to an original size in response to a release of the finger from the display screen;
when the reduction button is present, reducing the zoom target, in response to a touch of the finger on the reduction button; and
when the undo button is present, restoring the size of the zoom target so that the size becomes equal to the original size, in response to a touch of the finger on the undo button.

13. A non-transitory computer-readable storage medium containing software for causing a computer to perform the method according to claim 11.

14. A non-transitory computer-readable storage medium containing software for causing a computer to perform the method according to claim 12.

15. The method according to claim 12, further comprising:
vibrating the display screen to impart to the finger in touch with the display screen, haptic feedback as a response, with higher levels of vibrations as an intensity of the user touching the display screen with the finger becomes higher.

16. The method according to claim 12, further comprising:
storing in a memory a touch position of the finger on the display screen when the zoom target is being enlarged, as a zoom center point; and
reducing the zoom target using the same zoom center point as that previously stored in the a memory.

\* \* \* \* \*